United States Patent
Tournour et al.

(10) Patent No.: US 9,392,800 B2
(45) Date of Patent: Jul. 19, 2016

(54) DIAGONAL LINKAGE KNOCK OUT

(75) Inventors: Robert Tournour, Plymouth, WI (US); Richard A. Payne, Plymouth, WI (US)

(73) Assignee: Tomahawk Manufacturing, Inc., Plymouth, WI (US)

( * ) Notice: Subject to any disclaimer, the term of this patent is extended or adjusted under 35 U.S.C. 154(b) by 0 days.

(21) Appl. No.: 12/932,972

(22) Filed: Mar. 10, 2011

(65) Prior Publication Data
US 2012/0231132 A1    Sep. 13, 2012

(51) Int. Cl.
*B29C 39/02*    (2006.01)
*A23P 1/10*    (2006.01)
*A22C 7/00*    (2006.01)

(52) U.S. Cl.
CPC .............. *A22C 7/00* (2013.01); *A22C 7/0038* (2013.01); *A23P 1/105* (2013.01)

(58) Field of Classification Search
CPC ........ A22C 7/00; A22C 7/0038; A23P 1/105; B29C 2045/0425; B29C 45/401; B29C 33/442; B29C 39/36
USPC ................................................ 425/442, 444
See application file for complete search history.

(56) References Cited

U.S. PATENT DOCUMENTS

| | | | |
|---|---|---|---|
| 3,679,340 A * | 7/1972 | Springs ........................ | 425/163 |
| 3,731,345 A * | 5/1973 | Brackman ..................... | 425/556 |
| 3,752,622 A * | 8/1973 | Viadana ....................... | 425/78 |
| 3,887,964 A | 6/1975 | Richards | |
| 4,013,391 A * | 3/1977 | Boden et al. ................. | 425/145 |
| RE30,096 E | 9/1979 | Richards | |
| 4,697,308 A | 10/1987 | Sandberg | |
| 4,872,241 A | 10/1989 | Lindee | |
| 4,928,591 A | 5/1990 | Lindee | |
| 5,980,228 A * | 11/1999 | Soper ........................... | 425/145 |
| 6,572,360 B1 | 6/2003 | Buhlke et al. | |
| 6,713,111 B1 * | 3/2004 | Tournour et al. ............ | 426/512 |
| 7,021,922 B2 | 4/2006 | Azzar | |
| 7,163,391 B2 * | 1/2007 | LaBruno et al. ............. | 425/572 |
| 7,175,417 B2 | 2/2007 | LaBruno | |
| 7,232,539 B2 * | 6/2007 | Irwin et al. .................. | 264/334 |
| 7,335,013 B2 | 2/2008 | Hansen | |
| 7,422,425 B2 | 9/2008 | Hansen | |
| 7,591,644 B2 * | 9/2009 | Sandberg et al. ............ | 425/572 |
| 7,677,880 B2 | 3/2010 | Moore | |
| 7,775,790 B2 | 8/2010 | Lindee | |
| 8,317,506 B2 * | 11/2012 | Moore et al. ................ | 425/236 |
| 2005/0089596 A1 * | 4/2005 | Gosz et al. ................... | 425/208 |
| 2007/0184145 A1 * | 8/2007 | LaBruno et al. ............. | 425/406 |
| 2008/0089971 A1 * | 4/2008 | Sandberg et al. ............ | 425/430 |
| 2008/0233226 A1 * | 9/2008 | Taylor et al. ................. | 425/135 |
| 2010/0209575 A1 * | 8/2010 | Moore et al. ................ | 426/389 |
| 2012/0219658 A1 * | 8/2012 | Juravic et al. ............... | 425/442 |

\* cited by examiner

*Primary Examiner* — Yogendra Gupta
*Assistant Examiner* — Emmanuel S Luk

(57) ABSTRACT

A diagonal knock out system that is designed to remove mold food portions from a mold plate in a direction other than vertical.

6 Claims, 3 Drawing Sheets

DIAGONAL LINKAGE KNOCK OUT

FIELD OF THE INVENTION

The present invention relates to a diagonal knock out system that is designed to remove mold food portions from a mold plate in a direction other than vertical.

BACKGROUND OF THE INVENTION

U.S. Pat. No. 7,775,790 relates to a food molding mechanism for a patty-forming machine that uses a servomotor to drive a crank arrangement. The crank arrangement drives a mold plate. The mechanism uses a reducer with a replaceable output shaft. The reducer engages a servomotor utilizing a double enveloping worm gear providing gear enmeshment across an arc portion of the servomotor main gear. A servomotor driven knockout apparatus comprises a cam and lever arrangement. Oil reservoirs for the knockout cams are substantially sealed in the mold cover.

U.S. Pat. No. 7,677,880 relates to a system includes a high speed reciprocating mold plate patty-forming machine and a downstream patty presser. The high speed patty forming machine provides patties at a high production speed onto an output conveyor portion. The patty presser includes an upper conveyor having an upper endless belt. The upper conveyor is located above the output conveyor, wherein facing belt surfaces of the upper and lower endless belts define a path between the upper and lower conveyors. The upper conveyor has a tilted section such that a first clearance at an input to the path is equal to or greater than a thickness of the patties and a second clearance at an outlet of the inlet length is less than a thickness of the patties at the input of the path. A shuttle conveyor is arranged at the output of the path and delivers patties to an indexing packaging machine.

U.S. Pat. No. 7,422,425 relates to a knockout drive system for a food patty molding machine includes an electric motor; a rotary-to-linear motion converting apparatus operatively connected to the electric motor; and at least one knockout member operatively connected between the rotary-to-linear motion converting apparatus and the knockout plungers, to reciprocate the knockout plungers. The mold plate and knockout plungers are not mechanically linked to be driven together but are independently driven. The electric motor of the knockout drive system is a servo driven motor wherein the speed, acceleration, deceleration and dwell periods of the knockout plungers can be precisely controlled to be synchronized with the mold plate movements and positions, and for the type of food product, the output rate and the shape of the patties.

U.S. Pat. No. 7,335,013 relates to a drive system reciprocates a mold plate between a cavity fill position and a patty discharge position, and can also reciprocate knock out plungers to discharge molded food patties from cavities in the mold plate at the patty discharge position. This drive system includes a first electric motor; a first rotary-to-linear motion converting apparatus operatively connected to the first electric motor; at least one drive member operatively connected between the first rotary-to-linear motion converting apparatus and the mold plate to reciprocate the mold plate. The drive system can also include a second electric motor; a second rotary-to-linear motion converting apparatus operatively connected to the second electric motor; and at least one knock out member operatively connected between the second rotary-to-linear motion converting apparatus and the knock out plungers, to reciprocate the knock out plungers. The first and second motors are precisely controlled to control and synchronize the movements of the mold plate and knock out plungers. The drive system can also include a control over a plurality of valves in a mold plate breather air pumping system.

U.S. Pat. No. 7,175,417 relates to a food patty-forming apparatus for forming food patties from pressurized food product includes a mold plate that is guided to reciprocate longitudinally between a fill position and a discharge position. The mold plate has a cavity that is open to the source of pressurized food product when in the fill position. The cavity is exposed when in the discharge position. A mold pattern having open areas and solid areas is arranged adjacent a first face of the cavity, and indented from a second face. A knockout plunger has open areas corresponding to the solid areas of the pattern and solid areas corresponding to the open areas of the mold pattern. The knockout plunger is shaped to allow the solid areas of the plunger to penetrate into the cavity past the first face of the cavity around the solid areas to displace a patty formed in the cavity.

U.S. Pat. No. 7,021,922 relates to a portioning apparatus and a method. The apparatus includes a hopper and augers to push flowable material to a rotor. Retractable vanes on the rotor push the flowable material toward a fill slot as the rotor rotates. Below the fill slot, there is a mold plate with front and back mold cavities. In a front fill position, the mold plate is positioned so the front mold cavities are filled with flowable material from the fill slot while flowable material in the back mold cavities are pushed out by back knockouts. In a back fill position, the flowable material in the front mold cavities are pushed out by front knockouts while the back mold cavities are filled with flowable material from the fill slot. The mold plate reciprocatively oscillates between the front fill position and the back fill position for high output of portioned material.

U.S. Pat. No. 6,572,360 relates to an apparatus and method pertaining to food patty production. It allows high output production of food product patties at reduced machine operating speeds. This is accomplished by effectively utilizing a mold plate with multiple rows of patty cavities. Thus, more patties can be molded at slower operating speeds. This aspect of the invention reduces normal wear and tear on machines resulting in high efficiency output. The invention operated at reciprocating frequencies lower than those used in machines known in the industry can potentially increase output by two-fold, or more. The invention is also designed to produce patties of uniform size, weight and texture thereby promoting consistent cooking and food safety. This is accomplished by a (1) specified operation timing sequence and (2) custom designed fill slots which serve as a conduit between a food product source and a patty cavity. The apparatus is adaptable for use in standard food patty molding machines.

U.S. Pat. No. 4,928,591 relates to a food product molding mechanism for producing rod-shaped food products such as sausages, which may be implemented by conversion tooling in a reciprocal mold plate food patty molding machine, comprises an aligned assembly of N mold tubes mounted in alignment with a fill passage that supplies a moldable food product to the mold tubes. The mechanism further includes front and rear drawbars interconnected in fixed spaced relation by guide rods that guide the drawbars for reciprocal movement, along a mold path, between a fill position and a discharge position. N front mold rods project from the front drawbar toward the mold tubes; N rear mold rods project from the rear drawbar into the mold tubes. The spacing between facing ends of the two mold rods for each mold tube is less than the mold tube length. With the mold rod assembly in its fill position both mold rods project into each mold tube and determine the length of the food product; for the discharge position of the mold rod assembly each rear mold rod projects completely through its mold tube and the food products are all displaced completely out of the mold tubes.

U.S. Pat. No. 4,872,241 relates to a mechanism for molding food patties from a fibrous food product (e.g. poultry breasts, fish fillets, large pieces of pork muscle, etc.) using a conventional mold plate positioned between a fill plate and a breather plate and cyclically movable between a fill position and a discharge position; the fill plate has fill ports, one for each mold cavity in the mold plate, through which the food product is pumped under pressure, each mold cavity having a substantially larger area than its associated fill port. Each fill port has a transitional rim, past which the food flows with an appreciable change in direction that is smoothly rounded to avoid damage to the food fibers. Each fill port also has a cutting rim, past which a part of the filled mold cavity moves on its way to a discharge position; the cutting rim shears off any food fibers along part of one face of the patty. Preferably, the breather holes in the breather plate are confined to the periphery of each mold cavity position.

U.S. Pat. No. 4,697,308 relates to a molding mechanism for molding food patties from a whole fiber food product (e.g. poultry breasts, fish filets, large pieces of pork muscle, etc.) comprising a mold plate interposed between planar surfaces of a cover member and a fill member and moving cyclically between a fill position and a discharge position, the mold plate including plural mold cavities that are aligned one-for-one with fill apertures in the fill member through which the food product is pumped under substantial pressure when the mold plate is in its fill position. A plurality of shear blades, one for each mold cavity, are positioned adjacent the fill member intermediate the fill and discharge positions of the mold plate; the shear blades are driven into engagement with the mold plate each time the mold plate moves toward its discharge position to shear food fibers trailing from the mold cavities between the mold plate and the fill member. A plurality of knives, projecting from the portions of the fill member intermediate the fill apertures, cut food product segments that would otherwise bridge those portions of the fill member.

U.S. Pat. No. 3,887,964 and RE 30,096 relate to a high speed food patty molding machine, for manufacturing hamburger patties or other molded food products, comprising two large piston pumps operating in overlapping alternation to feed moldable food material continuously to a manifold that in turn feeds a cyclic molding mechanism. The molding mechanism need not operate synchronously with the pumps; the volumetric capacity of each pump is several times larger than the volume of meat or other moldable feed material required to fulfill a molding cycle. The pressure of the food feed is adjustable for different product requirements. The molding mechanism includes an elevator system for raising the complete mold assembly to a changeover position.

SUMMARY OF THE INVENTION

The present invention relates to a diagonal knock out system that is designed to remove mold food portions from a mold plate in a direction other than vertical. It is an object of the present invention for the angle to vary based on the linkage.

It is an object of the present invention for the angle to be approximately 30-60°.

The way the unit functions is that as the knock out drives move downward, through various linkage combinations or cam followers, the product inside the cavities can be pushed downward in a direction other than vertical.

It is an object of the present invention for the knock out system to allow the molded food portion to be configured with non-vertical walls.

It is an object of the present invention for the molded food portions to give the appearance of being sliced as opposed to formed.

It is object of the present invention for the machine to comprise, a patty molding machine of the type utilizing a hopper or storage device to which product is loaded and moved forward by a combination of a conveyor and augers into a chamber. The product in the chamber is compressed by an electrically, mechanically, or hydraulically powered plunger into a manifold. The product is then forced through a valve mechanism into a manifold, and eventually into cavities in a mold plate which is driven reciprocally. At the discharge position the patties are discharged at an angle other than vertical by knockouts.

It is an object of the present invention for the patties to have the appearance of being a round product being sliced at a bias or angle. It is an object of the present invention to have the device produce shapes other than round to have a bias cut.

It is an object of the present invention for the non-vertical knock out motion to be created by a combination of mechanical devices such as cams, or linkages, which can be driven by any standard knockout drive on any forming machine.

It is an object of the present invention for the knockouts to be driven by, mechanical, pneumatic, electrical, hydraulic, servo, or other drive mechanisms.

It is an object of the present invention for the device to provide a non-vertical discharge from a vertical discharge on a patty forming machine.

The present invention comprises a knock out tower, knock outs are in a retracted position having diagonal cavities. As the knock out moves downward, the linkages provide diagonal motion to eject molded food at a diagonal angle.

The present invention relates to a diagonal knock out system comprising; a knock out cup bar; draw bar; mold plate; machine knock outs; non vertical linkages which provide a diagonal motion and knock out cups.

The device comprises a material hopper, and plungers. The device further comprises a manifold, a mold plate, forming machine knock outs and a knock out system.

It is an object of the present invention for the diagonal knock out system to comprise a draw bar, knock out cups, a mold plate and a knock out cup bar. The device further comprises non-vertical linkage and machine knockouts.

The present invention relates to a method for providing a molded food product in the shape of a rod or cylinder comprising: placing the molded food product in a knock out system; driving the food product downward through knock out drives, linkage combinations or cam followers. The food product is pushed in a downward direction other than vertical. The molded food product is configured with non-vertical walls.

It is an object of the present invention for the method to further comprise forming molded food products which give the appearance of being sliced as opposed to formed.

The present invention relates to a method for providing a molded food product in the shape of a rod or cylinder comprising: loading food product in a hopper or storage; moving said food product forward by a combination of a conveyor and augers into a chamber; compressing the food product in the chamber by an electrically, mechanically or hydraulically powered plunger into a manifold. The food product is forced through a valve mechanism into a manifold and then into cavities in a mold plate. The mold plate is reciprocally driven, and the food product is discharged at an angle other than vertical by knockouts.

It is an object of the present invention for the method to produce shapes other than round to have a bias cut.

The present invention relates to a system for providing a molded food product in the shape of a rod or cylinder comprising a knock out tower; knock outs in a retracted position having diagonal cavities; linkages providing diagonal motion to eject molded food at a diagonal angle; a material hopper; plungers; a manifold; a mold plate; a knock out cup bar; draw bar; and knock out cups.

DETAILED DESCRIPTION OF THE INVENTION

Figure 1:
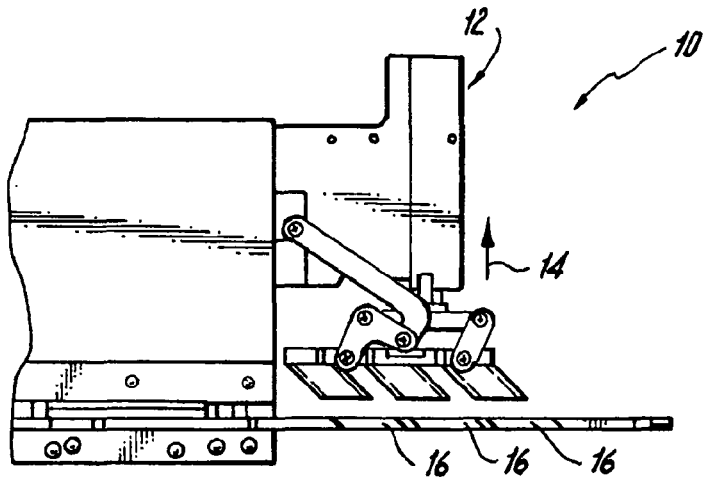
FIG. 1 shows a side view of the device of the present invention.

FIG. 1 shows the device 10 having an existing knock out tower 12, the knock out in a retracted position 14 having diagonal cavities 16. As the knock out moves downward, the linkages 18 provide diagonal motion to eject molded food at a diagonal angle.

Figure 2:
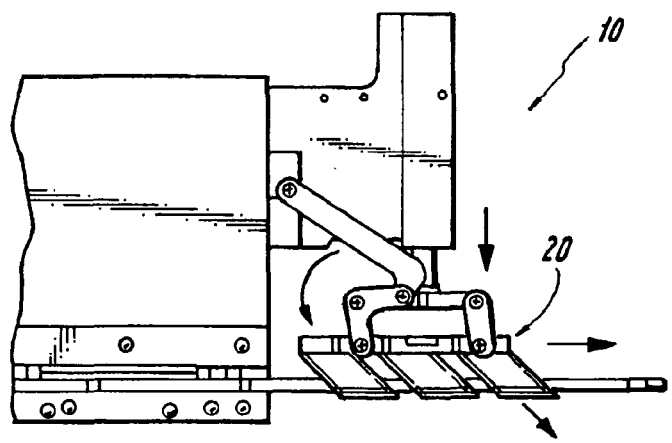
FIG. 2 shows a side view of the device of the present invention.

FIG. 2 shows the knock out bar 20.

Figure 3:
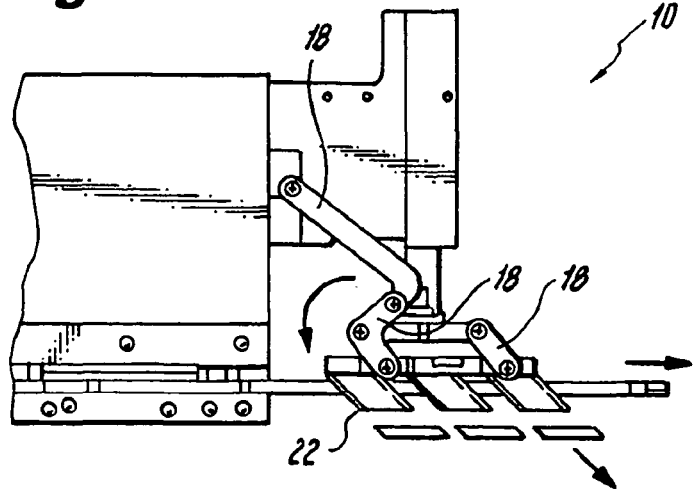
FIG. 3 shows a side view of the device of the present invention.

FIG. 3 shows the linkages 18 and the knock out cups 22.

Figure 4:
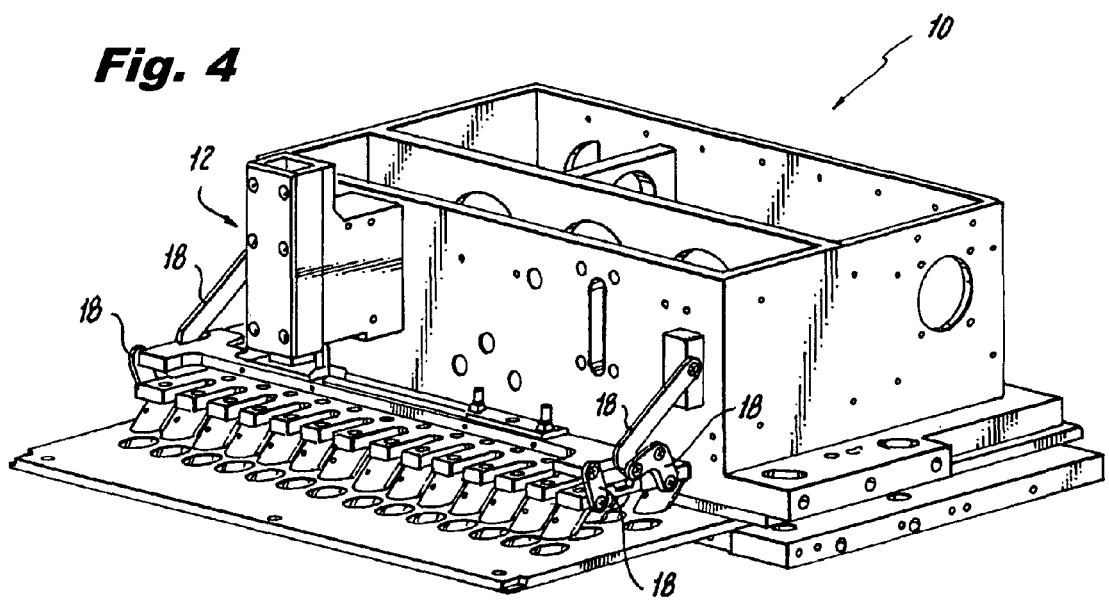
FIG. 4 shows a front view of the device of the present invention.

FIG. 4 shows the total structure of the device 10.

Figure 5:
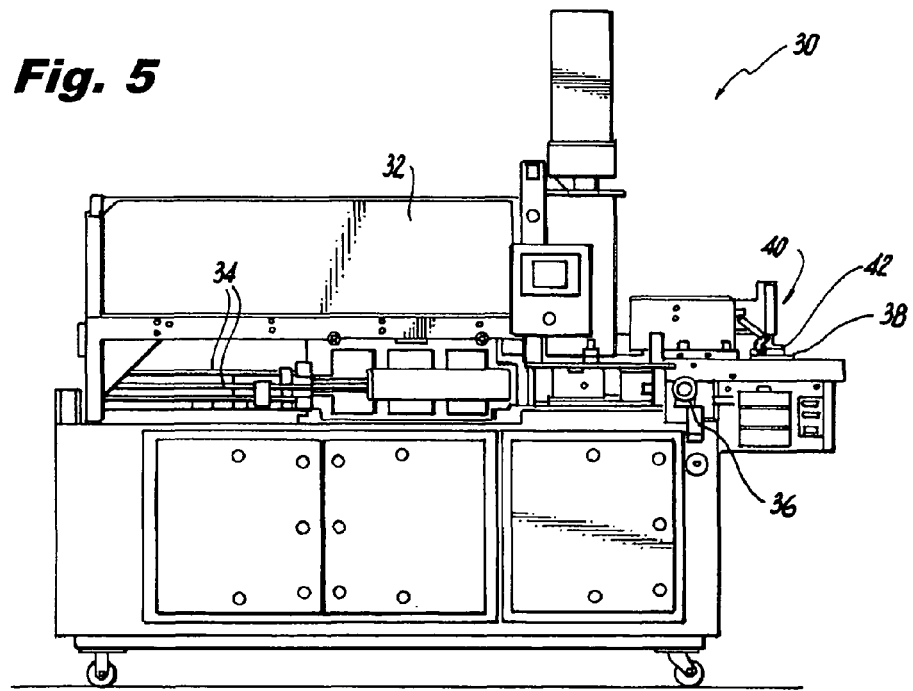
FIG. 5 shows a side view of the device of the present invention.

FIG. 5 shows the device 30 having a material hopper 32, plungers 34. The device 30 further comprises a manifold 36, a mold plate 38, forming machine knock outs 40 and a knock out system 42.

Figure 6:
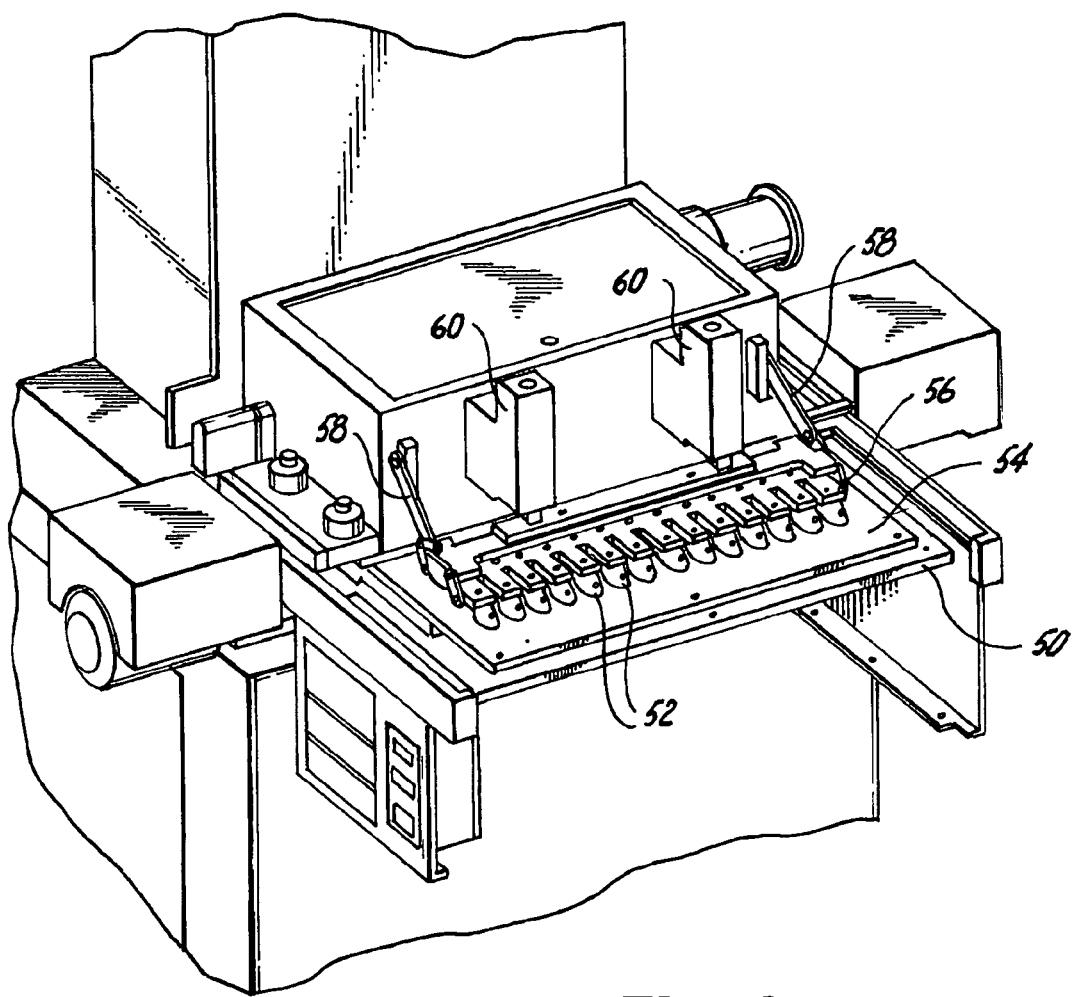
FIG. 6 shows a top view of the device of the present invention.

FIG. 6 shows a top view of the diagonal knock out system having a draw bar 50, knock out cups 52, a mold plate 54 and a knock out cup bar 56. The device further comprises non-vertical linkage 58 and machine knockouts 60.

The invention claimed is:

1. A diagonal knock out system comprising:
   a knock out cup bar that holds knock out cups;
   draw bar attached to a mold plate that allows said mold plate to reciprocate;
   said mold plate having shapes cut in it to produce a product;
   machine knockouts to which said cup bar is attached to;
   non-vertical diagonal linkages providing a diagonal motion; and
   said knock out cups knocking out said product from said mold plate.

2. The system of claim 1 wherein said system removes mold food portions from a mold plate in a direction other than vertical.

3. The system of claim 1 wherein an angle of diagonal motion is varied based on said linkage.

4. The system of claim 3 wherein said angle is approximately 30-60°.

5. The system of claim 1 wherein said knockouts are driven by, mechanical, pneumatic, electrical, hydraulic, servo, or other drive mechanisms.

6. A system for providing a molded food product in the shape of a rod or cylinder comprising:
   a knock out tower for supporting knock out cups;
   knock outs in a retracted position having diagonal cavities;
   diagonal linkages providing diagonal motion to eject molded food at a diagonal angle;
   a material hopper in which said food product is placed;
   plungers for pushing said food product from a pump box through a manifold to a mold plate;
   said manifold having orifices which change the flow of said food product from said hopper to said mold plate;
   said mold plate having shapes cut in it to produce said molded food product;
   a knock out cup bar for holding knock out cups;
   draw bar to which said mold plate is attached to allow reciprocation of said mold plate; and
   said knock out cups that knock out said molded food product from said mold plate.

* * * * *